US008174960B2

(12) United States Patent
Xu et al.

(10) Patent No.: US 8,174,960 B2
(45) Date of Patent: May 8, 2012

(54) WIRELESS COMMUNICATION SYSTEM BASED ON CODE SPREADING-ORTHOGONAL FREQUENCY DIVISION MULTIPLE ACCESS AND SMART ANTENNA

(75) Inventors: Guanghan Xu, Beijing (CN); Hang Li, Beijing (CN); Jun Huang, Beijing (CN)

(73) Assignee: Beijing Xinwei Telecom Technology, Inc., Beijing (CN)

( * ) Notice: Subject to any disclaimer, the term of this patent is extended or adjusted under 35 U.S.C. 154(b) by 210 days.

(21) Appl. No.: 12/682,441

(22) PCT Filed: Oct. 8, 2008

(86) PCT No.: PCT/CN2008/072616
§ 371 (c)(1),
(2), (4) Date: Apr. 9, 2010

(87) PCT Pub. No.: WO2009/049530
PCT Pub. Date: Apr. 23, 2009

(65) Prior Publication Data
US 2010/0238846 A1  Sep. 23, 2010

(30) Foreign Application Priority Data
Oct. 10, 2007  (CN) .......................... 2007 1 0175703

(51) Int. Cl.
*H04J 11/00* (2006.01)

(52) U.S. Cl. ........................................ 370/208; 370/330
(58) Field of Classification Search .................. 370/208, 370/203, 276, 295, 319, 334, 344, 349
See application file for complete search history.

(56) References Cited

U.S. PATENT DOCUMENTS

| 6,795,424 B1 * | 9/2004 | Kapoor et al. ............... 370/343 |
| 8,078,101 B2 * | 12/2011 | Karabinis et al. ............ 455/12.1 |
| 2010/0008332 A1 * | 1/2010 | Balachandran et al. ...... 370/336 |

* cited by examiner

*Primary Examiner* — Brenda H Pham
(74) *Attorney, Agent, or Firm* — Nixon Peabody LLP; Jeffrey L. Costellia

(57) ABSTRACT

A time division duplex wireless communication system based on Code Spreading-Orthogonal Frequency Division Multiple Access (CS-OFDMA) and a smart antenna includes: an antenna array and multichannel transceiver, a space processor, a demodulator, an L2 processor and a modulator. The CS-OFDMA system provided by the present invention combines synchronous CDMA technique and OFDMA technique, overcomes the severe ISI caused by spectrum-spreading by the conventional CDMA system while transmitting wideband data, effectively counteracts frequency-selective fading and inter-cell interference, and is beneficial to reliable transmission of narrowband voice and wideband data and also beneficial to co-frequency networking.

16 Claims, 3 Drawing Sheets

WIRELESS COMMUNICATION SYSTEM BASED ON CODE SPREADING-ORTHOGONAL FREQUENCY DIVISION MULTIPLE ACCESS AND SMART ANTENNA

FIELD OF THE INVENTION

The present invention relates to wireless communication technologies, and more particularly, to a wireless communication system based on Code Spreading-Orthogonal Frequency Division Multiple Access (CS-OFDMA) and smart antenna.

BACKGROUND OF THE INVENTION

Current widely applied wireless communication techniques include no more than the 3rd generation (3G) mobile communication technique in which Code Division Multiple Access (CDMA) plays a leading role and the WiMAX wireless wideband access technique in which Orthogonal Frequency Division Multiple Access (OFDMA) plays a leading role.

The CDMA stands for a code division multiple access technique. Briefly, it horizontally divides a bandwidth into multiple spread spectrum—Because the However, if uplink code channels of the CDMA are asynchronous, the Inter-Symbol Interference (ISI) will be enlarged greatly. The Synchronous CDMA (SCDMA) solves the problem of non-o However, in the presence of severe multi-path interference, orthogonality of the code channels will also be destroyed. Although multi-user joint detection technique has some effect on the multi-path condition, the performance still decreases greatly in the condition that there are too many users and the multipath is complicated. Meanwhile, it is quite difficult to realize the multi-user joint detection technique. Therefore, the CDMA is not applicable for wideband applications.

The OFDMA stands for orthogonal frequency division multiple access. Briefly, it longitudinally divides the bandwidth into multiple quite narrow frequency points and then implements frequency division multiple access through allocating the frequency points to different users. As long as an enough time interval (cyclic prefix) is reserved, signals of different users hardly interfere with each other because the between the frequency points will not be affected by the multi-path delay. Thus, the multi-user joint detection may be divided into multiple independent single-user detections. However, because the OFDMA is born by narrowband frequency points, its amplitude fluctuates dramatically in the case of multi-path, which causes severe signal attenuation, particularly to narrowband voice communications. In addition, because each two adjacent cells with the same frequency adopt the same frequency points, it is basically impossible to counteract interferences between adjacent cells and it is difficult to realize co-frequency networking.

SUMMARY OF THE INVENTION

The present invention provides a wireless communication system based on Code Spreading-Orthogonal Frequency Division Multiple Access (CS-OFDMA) and smart antenna, which avoids severe Inter-Symbol Interference (ISI) caused by a conventional CDMA system during transmission of wideband data and solves the problem of frequency selective fading and inter-cell interferences in the OFDMA technique.

The system includes: an antenna array and multichannel transceiver, adapted to receive a first CS-OFDMA signal from a terminal and transmit a second CS-OFDMA signal to the terminal, wherein receiving time does not overlap with transmitting time; a space processor, adapted to estimate a space-frequency channel response of the terminal according to the first CS-OFDMA signal received by the antenna array and multichannel transceiver from the terminal; a demodulator, adapted to perform a symbol detection according to the space-frequency channel response estimated by the space processor; an L2 processor, adapted to process a symbol detected by the demodulator, allocate uplink and downlink channels to the terminal according to a channel allocation definition of the system, generate a message for the terminal and a modulator and transmit the message to the modulator; the modulator, adapted to modulate the message into the second CS-OFDMA signal according to the space-frequency channel response estimated by the space processor and the message from the L2 processor, and transmit the second CS-OFDMA signal to the antenna array and multichannel transceiver.

The CS-OFDMA system provided by the present invention integrates the synchronous CDMA technique and the OFDMA technique. It firstly longitudinally divides the bandwidth into multiple narrowband frequency points and then horizontally modulates a symbol to the narrowband frequency points through an orthogonal CDMA code channel. Such integrated multiple access design combines advantages of the CDMA and the OFDMA, and also effectively avoids disadvantages of them. Specifically, because the OFDMA is used, it can overcome the severe ISI caused by spectrum-spreading by the conventional CDMA system while transmitting wideband data; in addition, it can divide the complicated and non-optimized multi-user joint detection into multiple simple and high-performance single-user detections. Meanwhile, because each symbol is spread to multiple frequency points at regular intervals, it effectively counteracts frequency-selective fading and inter-cell interference, and it is beneficial to reliable transmission of narrowband voice and wideband data and also beneficial to co-frequency networking.

Furthermore, the smart antenna technique, which adopts the antenna array and the time-space signal processing, is a signal processing technique which makes full use of space position information of mobile users to improve transmission quality and system capacity of mobile communications. The smart antenna technique in the present invention can increase the system's coverage area, anti-interference ability, spectrum utilization and performance in a mobile environment.

The present invention combines the CS-OFDMA and the smart antenna technique, and thus makes the wireless communication system have large coverage, high throughput and performances of co-frequency networking. Meanwhile, the present invention can support wideband and narrowband services, e.g. voice and wideband data services in high efficiency at the same time.

DETAILED DESCRIPTION OF THE INVENTION

In order to make the technical solution of the present invention clearer, the present invention will be explained in detail hereinafter with reference to embodiments and accompanying drawings.

Hereinafter, channel structure, frame structure, logical channels, synchronous mechanism and system structure of the CS-OFDMA system provided by the present invention will be respectively described.

1. The Channel Structure of the CS-OFDMA System

Figure 1:
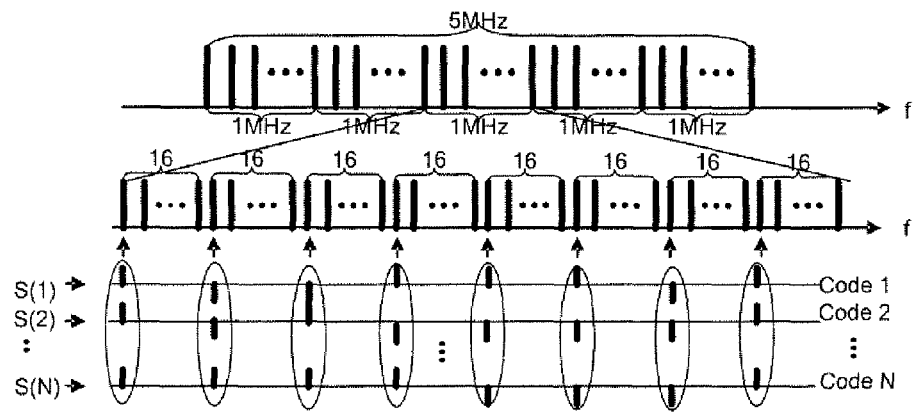
FIG. 1 is a schematic diagram illustrating CS-OFDMA signals in a frequency domain according to an embodiment of the present invention.

As shown in FIG. 1, the overall bandwidth of the CS-CDMA system of the present invention is 5 MHz. First, the overall 5 MHz bandwidth is divided into 5 independent sub-carrier groups and each sub-carrier group has a bandwidth of 1 MHz. Each sub-carrier group includes 128 frequency points, i.e. 128 OFDM sub-carriers. The 128 frequency points are further divided into 8 sub-groups and each sub-group includes 16 frequency points. One frequency point is selected from each sub-group in turn to form one subset, i.e. to form one channel allocation unit. The selected frequency points may be located in the same position or in different positions of the sub-groups. Thus, 16 subsets are formed in total and each subset consists of 8 frequency points. Then, i orthogonal codes are selected and are used to respectively spread frequencies of i symbols to be transmitted to the 8 frequency points in one subset. Specifically, suppose 8 orthogonal codes are selected. As to a symbol of one user to be transmitted, it is firstly spread by one of the 8 orthogonal codes to 8 frequency points (similar to 8 CDMA code chips) of one subset corresponding to the user. The 8 frequency-spreading frequency points are distributed in the whole 1 MHz sub-carrier group, i.e., energy of the symbol to be transmitted is spread to the whole 1 MHz bandwidth by the 8 independent frequency points. Similarly, the i orthogonal codes may be used to spread i symbols to the 8 frequency points, wherein i=1, 2, . . . , 8. As such, severe fading of some frequency points in a channel attenuation environment can be resisted and a CDMA spreading gain is obtained.

2. The Frame Structure of CS-OFDMA System

Figure 2:
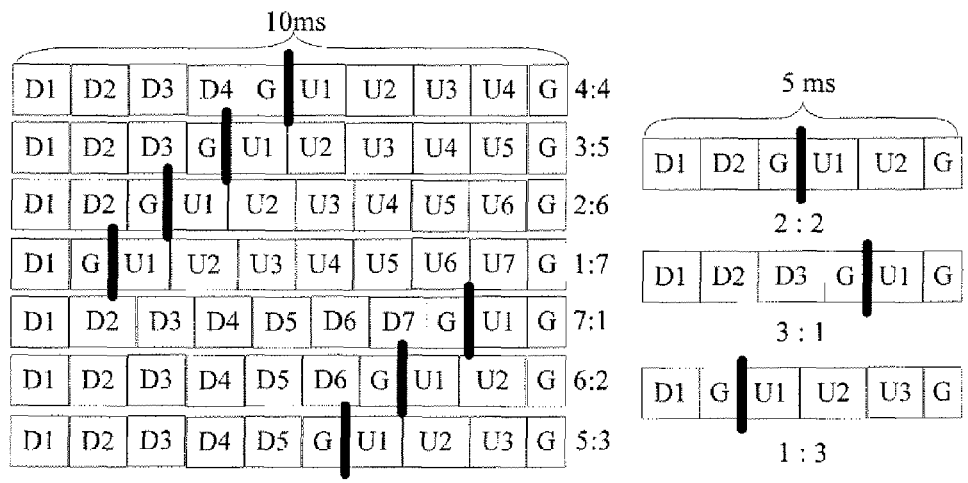
FIG. 2 is a schematic diagram illustrating allocation of uplink and downlink slots in 10 ms/5 ms frame structures in the CS-OFDMA system according to an embodiment of the present invention.

As shown in FIG. 2, the frame structure of the CS-OFDMA system in the present invention is adjustable. If Time Division Duplex (TDD) period is 10 ms, the whole 10 ms frame may be divided into 8 slots and its uplink-downlink ratio may be 1:7 to 7:1. If the TDD period is 5 ms, the 5 ms frame may be divided into 4 slots and its uplink-downlink ratio may be 1:3 to 3:1. Whether a frame is 5 ms or 10 ms, there is a guard slot from the uplink to the downlink and a guard slot from the downlink to the uplink. The header of the first downlink slot is a known preamble.

Figure 3:
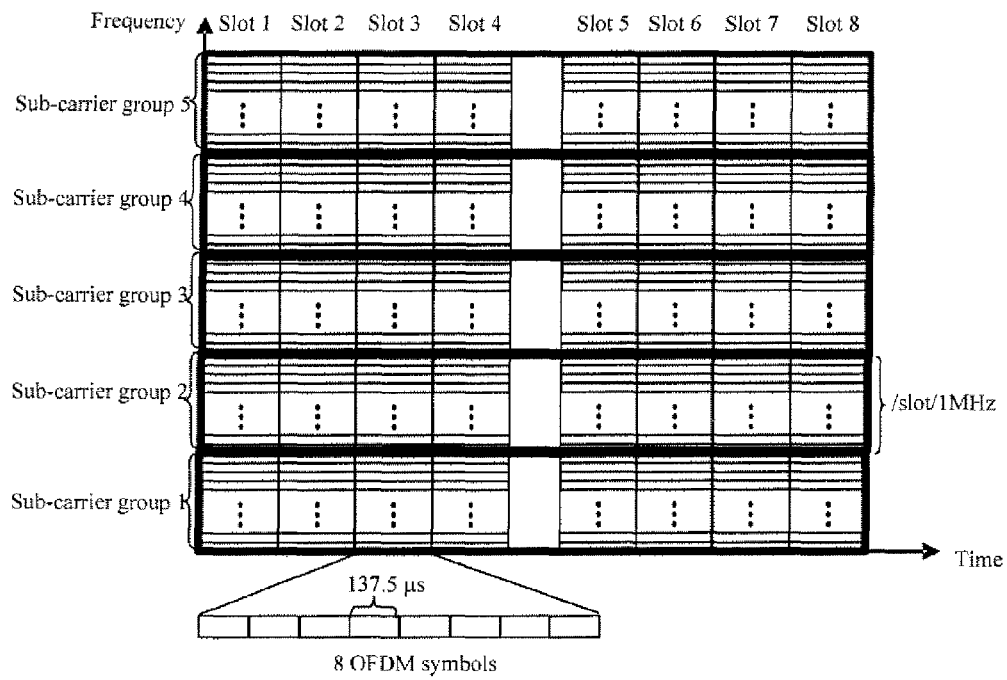
FIG. 3 is a time-frequency schematic diagram illustrating a 10 ms symmetrical (4:4) frame structure in the CS-OFDMA system according to an embodiment of the present invention.

FIG. 3 is a time-frequency schematic diagram illustrating channel allocation corresponding to the 10 ms frame structure. As shown in FIG. 3, the 5 MHz bandwidth is divided into five 1 MHz sub-carrier groups. Inside each slot, each sub-carrier group includes 16 channel units, and each channel unit includes 8 frequency points. Each channel unit occupies 8 OFDM symbols time and each OFDM symbol time is 137.5 µs. Among the 8 OFDM symbols, at least one is a pilot OFDM symbol. Furthermore, in each channel unit, there is one group of time-frequency windows corresponding to preamble index, i.e., no information is transmitted on the uplink and downlink at certain frequency points inside some OFDM symbols time. The time-frequency windows are used for observing interference and noise.

3. The Logical Channels of CS-OFDMA System

Figure 4:
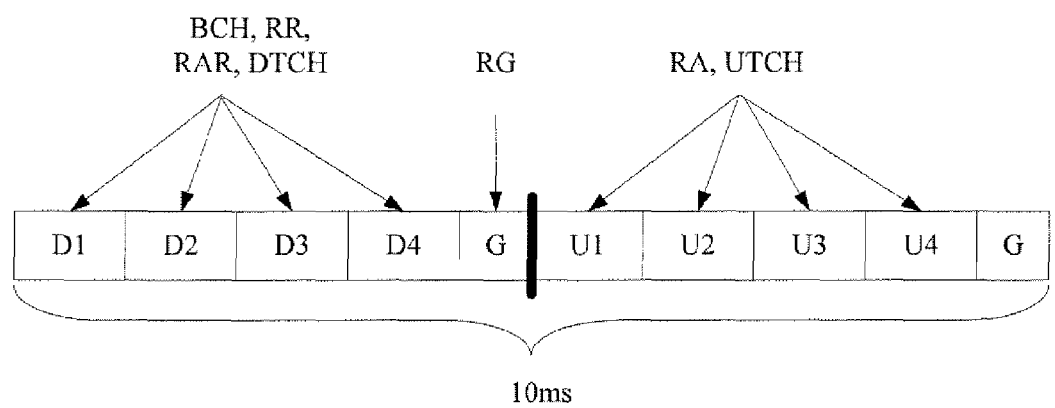
FIG. 4 is a schematic diagram illustrating mapping of logical channels and physical channels in the CS-OFDMA system according to an embodiment of the present invention.

The CS-OFDMA system of the present invention has the following 7 logical channels, and mapping of the logical channels to the physical frame is shown in FIG. 4.

a, Broadcast Channel (BCH), through which a base station broadcasts configuration/load information of the base station, paging information of a terminal, and other broadcast packets.

b, Ranging Channel (RG), through which the terminal transmits a ranging signal during a guard period between uplink and downlink to realize uplink synchronization.

c, Ranging Response Channel (RR), through which the base station returns synchronization information to the terminal after ranging.

d, Random Access Channel (RA), through which the terminal transmits uplink random access packets to the base station, requests initial channel allocation and turns into a communication state from a standby state.

e, Random Access Response channel (RAR), through which the base station returns initial channel allocation information to the terminal after receiving the random access request from the terminal.

f, Uplink Traffic Channel (UTCH), through which the terminal transmits service packets containing data, voice, control signaling and performance information to the base station.

g, Downlink Traffic Channel (DTCH), through which the base station transmits service packets containing data, voice, control signaling and performance information to the terminal.

4. The Synchronization Mechanism

As to all TDD systems, TDD timing always requires strict synchronization. The CS-OFDMA system of the present invention may be synchronized with any global clock through a Global Positioning System (GPS) or in a wireline manner. The base station and the terminals are synchronized through the following steps:

a, the terminal first detects a preamble in a first downlink slot (D1), and then searches any possible downlink slots for the BCH. Once finding the BCH, the terminal will find a TDD asymmetrical uplink-downlink ratio to realize downlink synchronization.

b, after realizing the downlink synchronization and capturing the RG channel and the RR channel, the terminal transmits a ranging signal to the base station, and receives uplink synchronization information through the RR channel.

c, in the communication mode, the synchronization is maintained by the preamble of the base station and uplink signals, and synchronization offset information is fed back to the terminal.

The detailed implementation of the above synchronization will be described in the following description of the CS-OFDMA system.

5. The System Structure of the CS-OFDMA System

Figure 5:
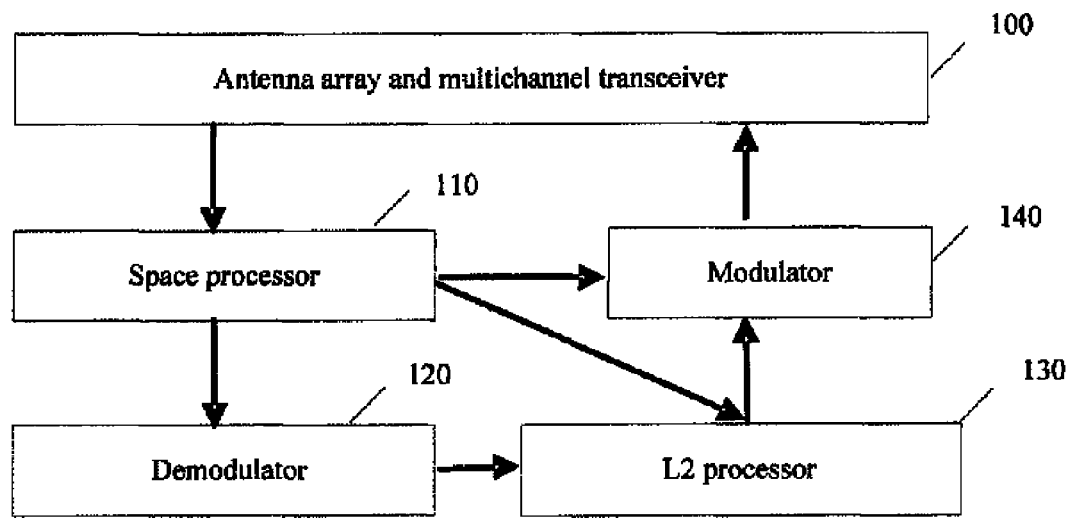
FIG. 5 is a schematic diagram illustrating a structure of the CS-OFDMA system according to an embodiment of the present invention.

FIG. 5 is a schematic diagram illustrating main functional modules of the CS-OFDMA system according to an embodiment of the present invention. The system includes: an antenna array and multichannel transceiver 100, a space processor 110, a demodulator 120, an L2 processor 130 and a modulator 140.

The antenna array and multichannel transceiver 100 is adapted to receive and amplify radio frequency signals, and then transform the radio frequency signals to baseband digital signals, then transmit the baseband digital signals to the space processor 110; or receive CS-OFDMA signals from the modulator 140, transform the CS-OFDMA signals into radio frequency signals, amplify the radio frequency signals and transmit the amplified radio frequency signals out via the antenna array.

The space processor 110 is adapted to estimate a space-frequency channel response of the terminal according to the CS-OFDMA signal received by the antenna array and multichannel transceiver 100 from the terminal. First, the space processor 110 samples the baseband digital signal transmitted by the antenna array and multichannel transceiver 100. Suppose that a sampled digital signal vector at time n is X(n), wherein X(n) is an M-dimension column vector and M denotes the number of antenna units in the antenna array. Then, estimate the space-frequency channel response.

Figure 6:
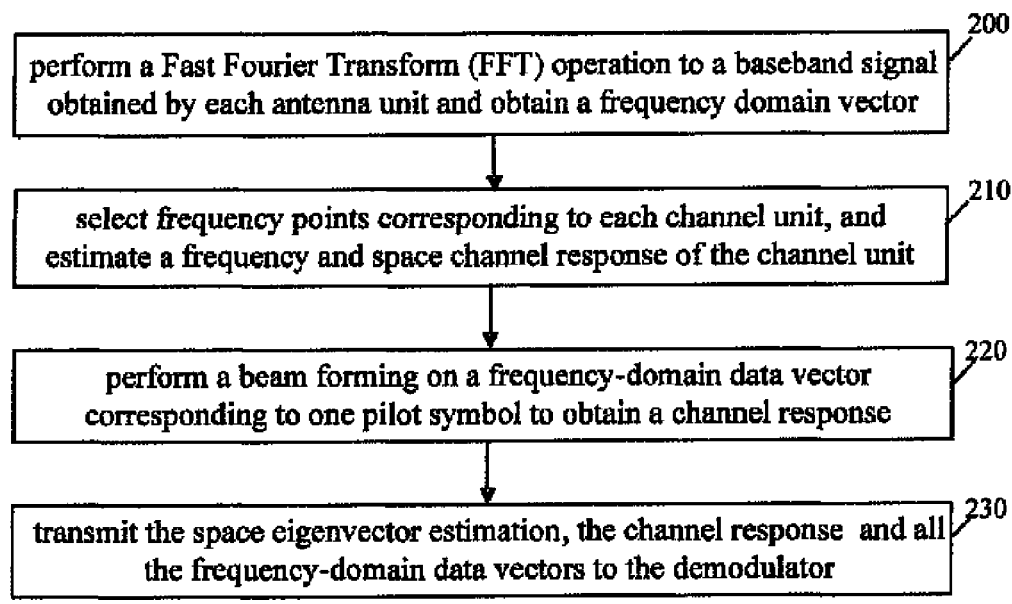
FIG. 6 is a flowchart illustrating the processing of uplink traffic data by a space processor of the CS-OFDMA system according to an embodiment of the present invention.

A process of estimating the space-frequency channel response by the space processor 110 is shown in FIG. 6, which mainly includes the following steps:

Step 200, during the time period of each symbol in an uplink frame, perform Fast Fourier Transform (FFT) operations on baseband signals corresponding to each antenna unit and obtain a frequency domain vector y(f), wherein f is a frequency index, y(f) is an M-dimension column vector corresponding to the M antenna units.

Step 210, select frequency points corresponding to pilot symbols in each channel unit, and estimate a frequency and space channel response of the channel unit, i.e. the space-frequency response. Herein, for description convenience, the space-frequency response may be regarded as a combination of a space eigenvector and a frequency-domain channel response. A preferred method for estimating the space eigenvector is to perform a Singular Value Decomposition (SVD) operation on a data matrix: $Y=[y(f_1), \ldots, y(f_n)]$. A left singular vector corresponding to the maximum singular value is an estimation a of the space eigenvector. As to the terminal to which multiple channel units are allocated, all frequency-domain data vectors of the pilot symbol may form a larger data matrix and the space eigenvector may be estimated more precisely.

Step 220, estimate a channel response $c(f_i)$. A preferred method is to perform a beam forming on the frequency-domain symbol vector $y(f_i)$ corresponding to one pilot symbol to obtain $c(f_i)=a^*y(f_i)/S_P(f_i)$, $i=1, \ldots, n$; wherein $a^*$ is a complex conjugate transpose of matrix a, and $S_P(f_i)$ is a pilot symbol of a frequency index $f_i$. If there is more than one pilot symbol, by adopting some averaging manner, a more precise estimation of the channel response may be obtained.

Step 230, transmit the space eigenvector estimation a, the channel response $c(f_i)$ and all the frequency-domain data vectors to the demodulator 120.

Besides the above steps, the space processor 110 may further estimate interference characteristics and noise on time-frequency windows of multiple uplink receiving channels, and transmits an estimated result to the demodulator 120 to perform interference counteraction processing. The interference characteristics include interference power and an interference covariance matrix.

First, the demodulator 120 adopts the space eigenvector estimation a to perform beam forming, and then adopts the channel response $c(f_i)$ and the frequency-domain data vectors to estimate the symbol S.

Based on the space eigenvector estimation a and the channel response $c(f_i)$, a theoretical expression of a noise-free frequency-domain data vector may be obtained: $y(f_i)=aP(i)c(f_i)S$, wherein P(i) is the $i^{th}$ row of a code-spreading matrix P, S is a n-dimension column vector containing n digital symbols, such as QPSK and QAM16 modulation to a CS-OFDMA waveform.

Weight of the beam forming may be the space eigenvector, i.e. w=a. Thus, signal strength will be the largest. Alternatively, it may be designated as $w=R_n^{-1}a$ to optimize a signal-to-interference ratio, wherein $R_n^{-1}$ is the inverse of a noise and interference covariance matrix. After the beam forming is performed, $z(f_i)=w^*y(f_i)$ is obtained.

As to the estimation of the data symbol S, a preferred method of the present invention is implemented through the following formula: $S=Q^{\#}Z$, wherein $Z=[z(f_1), \ldots, z(f_n)]'$, $Q=[P(1)', \ldots, P(n)']'\Phi$, $\Phi=\text{diag}\{c(f_1), \ldots, c(f_n)\}$ is a diagonal matrix of $c(f_i)$,' represents matrix transposition, and $Q^{\#}$ represents a pseudo-inversed matrix of Q. If σ is obtained through previous experiences or the space processor 110, it is possible to estimate the S according to a Minimum Mean Square Error (MMSE) algorithm, i.e. $S=(Q^*Q+\sigma I)^{-1}Q^*Y$, wherein I denotes a unit matrix. Based on the data symbol S, the demodulator 120 selects a pre-defined modulation point which is closest to the symbol S on the constellation, so as to perform a standard symbol detection. The corresponding result is stored as $S_d$.

Another optimization method for estimating the data symbol S in the present invention is as follows: the demodulator 120 transmits $S_d$ back to the space processor 110 and the space processor 110 re-estimates the space eigenvector estimation a and the channel response $c(f_i)$ according to the $S_d$ and a formula of $a=Y(SS^*)^{-1}S^*$, wherein $S=[p(1)c(f_1)Sd, \ldots p(n)c(f_n)Sd]$. The Y and S may be applied to other symbols or pilot symbols besides the same terminal so as to obtain more precise estimation of the space eigenvector. According to the updated space eigenvector estimation a, the demodulator 120 may obtain an updated symbol $S_d$ according to the forgoing process. The above two processes may be performed iteratively until any one of the following conditions is satisfied: the $S_d$ converges or a predefined number of iterative times is reached.

Next, the demodulator 120 calculates a Signal-to-Noise Ratio (SNR), i.e. $SNR=10 \log_{10}(|S_d|^2/|S-S_d|^2)$.

Finally, the demodulator 120 transmits all results, including the detected symbol, the space eigenvector estimation a, the channel response $c(f_i)$, the interference statistics, the uplink signal strength and the SNR, to the L2 processor 130.

The L2 processor 130 processes the detected symbol, including channel decoding and packet-reassembling, to retrieve uplink L2 messages from the terminal. The L2 messages contain a terminal power control command, terminal downlink interference and noise statistics, and a downlink SNR. As to an online terminal which is communicating with the base station, the L2 processor 130 further reallocates channels according to factors such as an uplink or downlink traffic mode, the SNR and the interference statistics, etc. In addition, the L2 processor 130 further performs downlink power control based on the terminal power control command, and implements uplink power control based on uplink information such as the signal strength, the SNR and the interference statistics. The L2 processor 130 further generates L2 packets for the channel reallocation. These L2 packets together with other service packets and OAM packets are converted to message symbols and then transmitted to the modulator 140 to be modulated to the downlink traffic channel. It should be noted that the channel reallocation command is generally transmitted to a dedicated broadcast channel. In the present invention, the channel reallocation command is transmitted to the traffic channel, which can achieve the following advantages: 1) the traffic channel after the beam forming has a higher diversity quality and thus the downlink power is saved greatly; 2) resources for transmitting terminal ID information are saved; 3) common-access channel resources are saved greatly, and thus the CS-OFDMA system of present invention can effectively process concurrency of a huge number of terminals.

The L2 processor 130 further generates downlink L2 messages containing fields such as an uplink power control command, and transmits the space eigenvector estimation a, the channel response $c(f_r)$ and all downlink message symbols to the modulator 140.

Firstly, the modulator 140 generates downlink beam forming vectors for all terminals. In an implementation manner of the present invention, a downlink weight vector may be its corresponding space eigenvector estimation, i.e. $w_d=a$, so as to maximize the strength of a terminal downlink receiving signal. In order to minimize co-channel interference to other terminals, an uplink weight vector is adopted. The modulator 140 retrieves all message symbols from the L2 processor 130 and firstly performs code-spreading for each channel unit, i.e. $t(i)=Ps(i), i=1, \ldots, N$, wherein $t(i)$ is the $i^{th}$ symbol vector of a channel unit and P is a coding matrix. Next, perform the downlink beam forming to duplicate each symbol vector to the matrix: $[w_d(1)t(i), \ldots, w_d(M)t(i)]$, wherein $w_d(j)t(i)$ is a transmitting frequency-domain symbol vector of the $j^{th}$ antenna. After the beam forming is performed, a forming result corresponding to each antenna is placed to corresponding frequency points associated with the channel unit mapping. Next, perform an Inverse Fast Fourier Transform (IFFT) operation on each symbol to transform frequency-domain data to the time domain. And then, perform signals digital-analog conversion, upward frequency conversion to RF and microware band, amplification in turn and finally transmit to the antenna array and multichannel transceiver 100.

The foregoing describes the working principle of the CS-OFDMA system on the traffic channel of the online terminal. As to a new or standby terminal, i.e. an offline terminal which is not bi-directionally communicating with the base station, the above-mentioned modules may operate in different manners. There are two reasons why the terminal turns from the offline mode to the online mode. One is that the base station initiates paging to the terminal and the other depends on the terminal itself. If a call is initiated by the terminal, the terminal will transmit a random access packet containing information, such as the terminal ID, a downlink/uplink data rate request, transmission power and interference statistics, through a predetermined uplink random access channel. The terminal obtains channel information, such as the downlink/uplink data rate and the transmission power, through the broadcast channel. The antenna array and multichannel transceiver 100, the space processor 110 and the demodulator 120 will receive signals in a manner similar to that for processing the traffic signal, and the L2 processor 130 will receive the message symbol through the uplink random access channel and process the uplink random access packet. Then, allocate channels according to the data rate request, the interference statistics and available resources, etc. Next, prepare and transmit a downlink random access response packet containing the channel allocation information to the modulator 140 to be modulated to a predetermined downlink random access response channel. After receiving the channel allocation information, the terminal communicates with the base station through the allocated channel, and thus becomes an online terminal. If the base station initiates paging, after receiving the paging through the broadcast channel, the terminal transmits a paging response message through the uplink random access channel, and the subsequent operations are similar to those in the case that the call is initiated by the terminal.

Cooperation of the space processor 110 and the L2 processor 130 can maintain the uplink synchronization of the online terminal. Firstly, the space processor 110 may calculate delay $\Delta$ according to the channel response estimation $c(f_1)$, i.e. search for possible delay $\Delta$ to maximize an objective function $J(\Delta)=|e^{-j2\pi\Delta f_1}c(f_1)+ \ldots +e^{-j2\pi\Delta f_m}c(f_m)|^2$. Then, the L2 processor 130 transmits delay information to the modulator 140 via L2 messages.

Synchronization or ranging of the offline terminal requires cooperation of the antenna array and multichannel transceiver 100, the space processor 110 and the L2 processor 130. Firstly, the antenna array and multichannel transceiver 100 turns on a receiver in a guard slot from the downlink to the uplink in advance to generate a digital baseband signal. Then, the space processor 110 detects an uplink ranging signal from the digital baseband signal. For detection convenience, the terminal may choose one of multiple different ranging signals to transmit. The space processor 110 may perform correlation detection for all ranging signals. As to a signal exceeding a detection threshold, calculate and transmit the space eigenvector, the signal strength and the delay to the L2 processor 130. The L2 processor 130 generates power control and time adjustment commands according to the signal strength and the delay, encapsulates the power control and time adjustment commands into the L2 messages, and transmits the L2 messages to the modulator 140. The modulator 140 modulates the L2 messages to the RR channel, using space eigenvector for beam forming, and transmits it to the antenna array and multichannel transceiver 100. It should be noted that, familiar wireless communication systems arrange the RG channel in the traffic channel. Because the ranging signal of the offline terminal is quite random in both time and power, and it is very possible that the power thereof is higher than other traffic signals and cannot always be synchronized with other traffic signals. This type of ranging signals will cause much interference to the traffic signals. In the CS-OFDMA system of the present invention, the ranging channel is designed in a guard slot from the downlink to the uplink and is separated from the traffic channel in time, and thus the above problem is effectively solved.

The foregoing is only embodiments of the present invention. The protection scope of the present invention, however, is not limited to the above description. Any change or substitution, easily occurring to those skilled in the art, should be covered by the protection scope of the present invention.

The invention claimed is:

1. A time division duplex wireless communication system based on Code Spreading-Orthogonal Frequency Division Multiple Access (CS-OFDMA) and smart antenna, comprising:

an antenna array and multichannel transceiver, configured to receive a first CS-OFDMA signal from a terminal and transmit a second CS-OFDMA signal to the terminal, wherein receiving time does not overlap with transmitting time;

a space processor, configured to estimate a space-frequency channel response of the terminal according to the first CS-OFDMA signal received by the antenna array and multichannel transceiver from the terminal;

a demodulator, configured to perform a symbol detection according to the space-frequency channel response estimated by the space processor;

an L2 processor, configured to process a symbol detected by the demodulator, allocate uplink and downlink channels to the terminal according to a channel allocation definition of the system, generate a message for the terminal and a modulator and transmit the message to the modulator;

the modulator, configured to modulate the message into the second CS-OFDMA signal according to the space-frequency channel response estimated by the space processor and the message from the L2 processor, and transmit the second CS-OFDMA signal to the antenna array and multichannel transceiver.

2. The wireless communication system according to claim 1, wherein the space-frequency channel response estimated by the space processor comprises a space eigenvector and a frequency-domain channel response of the terminal.

3. The wireless communication system according to claim 1, wherein the channel allocation definition comprises: dividing one continuous bandwidth into multiple non-overlapping frequency bands, selecting, from each frequency band, at least one non-overlapping frequency point to form a channel allocation unit.

4. The wireless communication system according to claim 1, wherein the modulator is further configured to modulate a terminal channel reallocation message from the L2 processor to a downlink traffic channel which is currently allocated to the terminal.

5. The wireless communication system according to claim 1, wherein the space processor is further configured to obtain a space eigenvector of the terminal from a predetermined random access channel; the demodulator is further configured to demodulate an access request message of the terminal from the predetermined random access channel; the L2 processor is further configured to allocate a channel and generate an access response message for the terminal; the modulator is further configured to modulate the access response message to a predetermined random access response channel and perform beam forming according to the space eigenvector.

6. The wireless communication system according to claim 1, wherein the space processor is further configured to obtain interference and noise information from an uplink time-frequency window; the L2 processor is further configured to allocate a channel according to the interference and noise information.

7. The wireless communication system according to claim 1, wherein the demodulator is further configured to demodulate an uplink message which is transmitted by the terminal and contains interference and noise information received by the terminal; the L2 processor is further configured to allocate a channel according to the interference and noise information.

8. The wireless communication system according to claim 1, wherein the demodulator is further configured to demodulate an uplink message which is transmitted by the terminal and contains interference, noise and transmitting power information received by the terminal; the L2 processor is further configured to allocate a channel according to the interference, noise and transmitting power information.

9. The wireless communication system according to claim 1, wherein the space processor is further configured to detect an uplink ranging signal of the terminal as well as a delay and signal strength of the uplink ranging signal on a predetermined ranging channel; the L2 processor is further configured to generate a ranging response message containing timing and power control information according to the delay and the signal strength of the uplink ranging signal.

10. The wireless communication system according to claim 9, wherein the ranging channel is located in a guard slot from a downlink to an uplink.

11. The wireless communication system according to claim 1, wherein the space processor is further configured to detect an uplink ranging signal of the terminal as well as a delay, signal strength and a space eigenvector of the uplink ranging signal on a predetermined ranging channel; the L2 processor is further configured to generate a ranging response message containing timing and power control information according to the delay and the signal strength of the uplink ranging signal; the modulator is further configured to perform beam forming according to the space eigenvector, and modulate the ranging response message to a predetermined ranging response channel.

12. The wireless communication system according to claim 1, wherein the space processor is further configured to obtain a space eigenvector and estimate statistics of interference and noise on a time-frequency window corresponding to a channel; the demodulator is further configured to calculate weight of uplink beam forming for interference counteraction according to the space eigenvector and the estimated statistics of interference and noise.

13. The wireless communication system according to claim 6, wherein a location of the time-frequency window is determined by an index of a preamble of the wireless communication system.

14. The wireless communication system according to claim 1, wherein the space processor is further configured to estimate a delay of the terminal; the L2 processor is further configured to generate a timing command message of the terminal according to the delay; the modulator is further configured to modulate the timing command message to a terminal traffic channel.

15. The wireless communication system according to claim 1, wherein the space processor is further configured to obtain a space eigenvector of the terminal through a predetermined random access channel; the demodulator is further configured to obtain a terminal access request message which contains interference and noise information received by the terminal from the predetermined random access channel by way of demodulation; the L2 processor is further configured to allocate a channel according to the interference and noise information received by the terminal and generate a terminal access response message; the modulator is further configured to modulate the terminal access response message to a predetermined access response channel, and perform beam forming according to the space eigenvector.

16. The wireless communication system according to claim 12, wherein a location of the time-frequency window is determined by an index of a preamble of the wireless communication system.

* * * * *